(12) United States Patent
Dai

(10) Patent No.: US 12,163,848 B2
(45) Date of Patent: Dec. 10, 2024

(54) METHOD AND APPARATUS FOR IDENTIFYING PROBE ABNORMITY, STORAGE MEDIUM, AND ELECTRONIC DEVICE

(71) Applicant: CHANGXIN MEMORY TECHNOLOGIES, INC., Hefei (CN)

(72) Inventor: Zhaoyun Dai, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 631 days.

(21) Appl. No.: 17/447,226

(22) Filed: Sep. 9, 2021

(65) Prior Publication Data

US 2022/0155155 A1    May 19, 2022

Related U.S. Application Data

(63) Continuation of application No. PCT/CN2021/105301, filed on Jul. 8, 2021.

(30) Foreign Application Priority Data

Nov. 17, 2020    (CN) .......................... 202011287319.9

(51) Int. Cl.
*G01K 3/14*        (2006.01)
*G01K 15/00*      (2006.01)

(52) U.S. Cl.
CPC ............. *G01K 3/14* (2013.01); *G01K 15/007* (2013.01)

(58) Field of Classification Search
CPC ................................. G01K 3/14; G01K 15/007
See application file for complete search history.

(56) References Cited

U.S. PATENT DOCUMENTS

| | | | |
|---|---|---|---|
| 6,139,180 A | 10/2000 | Usher | |
| 2009/0159000 A1* | 6/2009 | Aggarwal | G01K 15/00 374/E7.004 |
| 2011/0207245 A1* | 8/2011 | Koshimizu | F27B 5/04 257/E21.529 |
| 2017/0234737 A1* | 8/2017 | Nogami | G01K 7/42 702/130 |

(Continued)

FOREIGN PATENT DOCUMENTS

| | | |
|---|---|---|
| CN | 102520742 A | 6/2012 |
| CN | 103911603 A | 7/2014 |

(Continued)

OTHER PUBLICATIONS

Translation of CN103911603A.*

(Continued)

*Primary Examiner* — Mirellys Jagan
(74) *Attorney, Agent, or Firm* — Syncoda LLC; Feng Ma

(57) ABSTRACT

A method for identifying the probe abnormality includes: obtaining current temperature data of a plurality of probes, and calculating a temperature difference value between every two pieces of current temperature data; comparing the temperature difference value with a preset temperature difference, and when the temperature difference value exceeds the preset temperature difference, determining that at least one of the plurality of probes is abnormal; and heating the device to a preset temperature, and determining an abnormal probe from the plurality of probes.

18 Claims, 9 Drawing Sheets

(56) References Cited

U.S. PATENT DOCUMENTS

2019/0235470 A1* 8/2019 Maekawa ............ G01K 15/007

FOREIGN PATENT DOCUMENTS

| CN | 108281717 A | 7/2018 | | |
|---|---|---|---|---|
| CN | 111845448 A | 10/2020 | | |
| CN | 111934032 A | 11/2020 | | |
| DE | 102011083277 A1 | * 3/2013 | .............. | B60L 11/14 |
| EP | 2899520 A1 | * 7/2015 | ........... | G01K 15/007 |

OTHER PUBLICATIONS

Kang Yongqiang, Yang Chengquan, Jiang Xiaoyun, et al. "Research and Verification of Blackbody Radiation Law", Physical Experiment of College, vol. 23 No. Aug. 4, 2010.

* cited by examiner

METHOD AND APPARATUS FOR IDENTIFYING PROBE ABNORMITY, STORAGE MEDIUM, AND ELECTRONIC DEVICE

CROSS-REFERENCE TO RELATED APPLICATIONS

This application is a continuation of International Application No. PCT/CN2021/105301 filed on Jul. 8, 2021, which claims priority to Chinese Patent Application No. 202011287319.9 filed on Nov. 17, 2020. The contents of these applications are hereby incorporated by reference in their entirety.

BACKGROUND

Semiconductor memory devices generally use heat treatment device during production and processing. The heat treatment device is provided with multiple probes to monitor the temperature in the heat treatment process, so as to ensure smooth progress of the heat treatment process.

SUMMARY

The present disclosure relates to the technical field of integrated circuits, and particularly, to a method and apparatus for identifying the probe abnormity (i.e., abnormality), a storage medium, and an electronic device.

According to an aspect of the disclosure, a method for identifying a probe abnormality is provided. The method is applied to a device including multiple probes. The method includes: obtaining current temperature data of the multiple probes, calculating a temperature difference value between every two pieces of current temperature data; comparing the temperature difference value with a preset temperature difference, when the temperature difference value exceeds the preset temperature difference, determining that at least one of the plurality of probes is abnormal; heating the device to a preset temperature, and determining an abnormal probe from the multiple probes.

According to an aspect of the disclosure, an apparatus for identifying a probe abnormality is provided. The apparatus is applied to a device including multiple probes. The apparatus includes: a data processing module, configured to obtain current temperature data of the plurality of probes, and calculate a temperature difference value between every two pieces of current temperature data; an abnormality preliminary determination module, configured to compare the temperature difference value with a preset temperature difference, and when the temperature difference value exceeds the preset temperature difference, determine that at least one of the multiple probes is abnormal; and an abnormality determination module, configured to heat the device to a preset temperature, and determine an abnormal probe from the multiple probes.

According to an aspect of the disclosure, a computer-readable storage medium is provided. The computer-readable storage medium has computer program stored thereon, and when the computer program is executed by a processor, any one of the foregoing method for identifying the probe abnormality is implemented.

According to an aspect of the disclosure, an electronic device is provided. The electronic device includes: a processor; and a memory for storing instructions executable by the processor. The processor is configured to perform any one of the foregoing method for identifying the probe abnormality by executing the executable instructions.

It should be understood that the above general description and the following detailed description are merely exemplary and explanatory, and are not intended to limit this disclosure.

BRIEF DESCRIPTION OF THE DRAWINGS

The accompanying drawings herein, which are incorporated into the description and constitute a part of the description, illustrate embodiments that conform to the present disclosure and are used together with the description to explain the principles of the disclosure. It is apparent that the accompanying drawings in the following description illustrate merely some embodiments of the disclosure, and those ordinary skilled in the art can still derive other accompanying drawings from these accompanying drawings without involving an inventive effort.

DETAILED DESCRIPTION

Figure 1:
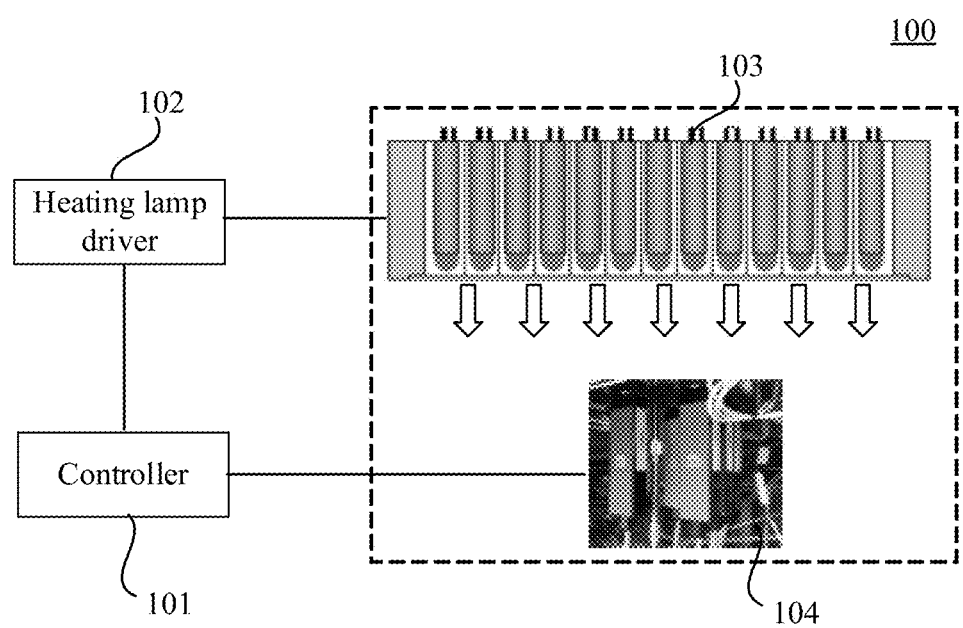
FIG. 1 is a schematic diagram illustrating temperature control of a heat treatment device.

Exemplary embodiments will now be described more fully with reference to the accompanying drawings. However, the exemplary embodiments may be implemented in various forms, and should not be construed as being limited to the examples set forth herein. Instead, providing these embodiments makes the disclosure more comprehensive and complete, and will fully convey the concept of the exemplary embodiments to those skilled in the art. The same reference signs in the drawings denote the same or similar structures, and will not be elaborated.

Although relative terms such as "upper" and "lower" are used in the description to describe a relative relationship of one component of the icon to another component, these terms are used in this description for convenience only, for example, according to directions of examples described in the accompanying drawings. It should be understood that if the apparatus of the icon is flipped upside down, the component described "above" will become the component "below". Other relative terms such as "high" and "low", "top" and "bottom", and "left" and "right" also have similar meanings. When a structure is "on" another structure, it is possible that a structure is integrally formed on another structure, or that a structure is "directly" disposed on another structure, or that a structure is "indirectly" disposed on another structure through other structures.

The terms "one", "a", and "the" are used to indicate the presence of one or more elements/components, etc.; and the terms "including" and "having" are used to indicate an open including and indicate that there may be additional elements/components/etc. in addition to the listed elements/components/etc.

In the heat treatment process, if the temperature read by a probe is abnormal, the temperature inside the heat treatment device cannot reach a preset temperature, and when the temperature is extremely high, a wafer as a raw material of the semiconductor memory device may be deformed and damaged.

Various embodiments of the present disclosure can provide a method for identifying the probe abnormality to make a judgment of an abnormality state of the probe when the heat treatment device is in an idle state, so as to ensure that the probe is in a normal working state in the heat treatment process.

During production and processing of semiconductor integrated circuit devices, it is generally necessary to perform heat treatment on wafers as raw materials using heat treatment devices. For example, in the coating process, it is necessary to use a high-temperature process tool to thermally process a wafer, etc. In order to monitor the temperature in the heat treatment process, multiple probes are generally disposed in the heat treatment device. According to the temperature read by the probe, the temperature inside the heat treatment device may be fed back, so as to provide a reference basis for control and adjustment of internal temperature of the heat treatment device.

FIG. 1 is a schematic diagram illustrating temperature control of a heat treatment device. As illustrated in FIG. 1, the heat treatment device 100 includes a controller 101, a heating lamp driver 102, multiple heating lamps 103, and multiple probes 104. The controller 101 is used for obtaining a heating instruction and controlling the operation of the heating lamp driver 102. The heating lamp driver 102 is used for controlling the operation of multiple heating lamps 103. After the heating lamps 103 work, the temperature inside the heat treatment device 100 changes. In this case, multiple probes 104 read the temperature inside the heat treatment device 100 and feed back to the controller 101. After obtaining the temperature, the controller 101 determines whether to continue to control the heating lamp driver 102 to work, so as to ensure that the temperature inside the heat treatment device 100 reaches a predetermined temperature.

In the whole working process of the heat treatment device 100, the controller 101 needs to obtain the temperature of the probes 104 in real time. If the temperature read by the probes 104 drops, the controller 101 determines the output power of the heating lamp driver 102 according to the descending temperature to control multiple heating lamps 103 to work, so as to restore the temperature inside the heat treatment device 100 to the required temperature. Therefore, if the temperature read by the probes 104 is abnormal, the controller 101 may still control the heating lamp driver 102 according to the abnormal temperature, thereby rendering that the temperature inside the heat treatment device 100 is not the actually required temperature. Even worse, the temperature inside the heat treatment device 100 is far higher than the required temperature, resulting in the occurrence of wafer breakage.

Therefore, a method for identifying a probe abnormality is provided in the exemplary embodiments of the disclosure. The method can be used for identifying the probe abnormality during processing of the heat treatment device, and can also be used for identifying the probe abnormality in an idle state of the heat treatment device, so as to ensure that the probes are in a normal working state during processing of the heat treatment device, and improve the process yield of the heat treatment device.

Figure 2:
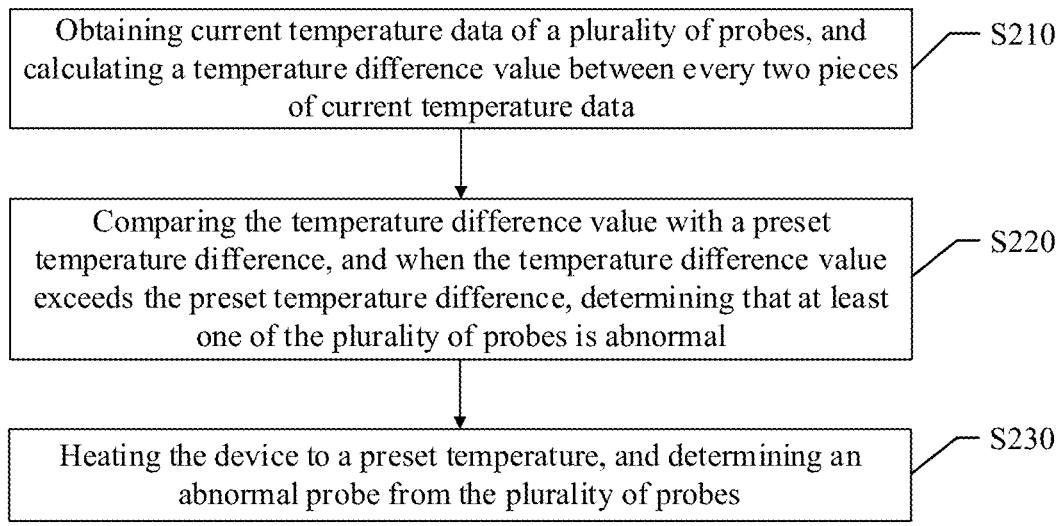
FIG. 2 is a flowchart illustrating a method for identifying a probe abnormality according to an exemplary embodiment of the disclosure.

FIG. 2 is a flowchart illustrating a method for identifying a probe abnormality according to an exemplary embodiment of the disclosure. As illustrated in FIG. 2, the method for identifying the probe abnormality may include steps S210 to S230.

In step S210, current temperature data of multiple probes is obtained, and a temperature difference value between every two pieces of current temperature data is calculated.

In step S220, the temperature difference value is compared with a preset temperature difference, and when the temperature difference value exceeds the preset temperature difference, it is determined that at least one of the multiple probes is abnormal.

In step S230, the device is heated to a preset temperature, and an abnormal probe is determined from the multiple probes.

According to the method for identifying the probe abnormality in the exemplary embodiments, in an aspect, the temperature difference value between the current temperature data of every two probes is calculated, the temperature difference value is compared with the preset temperature difference, and if the temperature difference value exceeds the preset temperature difference, it is determined that at least one of the multiple probes is abnormal. That is, it can be preliminarily determined that there is an abnormal probe, so as to provide a basis for subsequent work. In another aspect, after it is preliminarily determined that there is an abnormal probe, the abnormal probe can be determined by heating the device to the preset temperature, so that the abnormal probe may be repaired or replaced timely, the probability that the probes of the device are abnormal in the processing process is reduced, and the process yield of the device is improved.

The method for identifying the probe abnormality in the exemplary embodiments is further described below. It should be understood that the method for identifying the probe abnormality may be performed by the controller 101.

In step S210, current temperature data of multiple probes is obtained, and a temperature difference value between every two pieces of current temperature data is calculated.

In practical application, a device for performing high-temperature heat treatment is generally arranged with two or more probes, and the probes are arranged at different positions so as to monitor the temperature inside the device in real time.

In the exemplary embodiment, calculating the temperature difference between current temperature data of every two probes may include: calculating a temperature difference between every two of the multiple probes to improve the accuracy of preliminary determination of the probes that may be abnormal.

In practical application, the current temperature data of the multiple probes may be obtained at a preset time interval, and the current temperature data is temperature data of the multiple probes at a same time. That is, the current temperature data of the two probes, of which temperature difference value is calculated, is the temperature data at a same time.

In step S220, the temperature difference value is compared with a preset temperature difference, and when the temperature difference value exceeds the preset temperature difference, it is determined that at least one of the multiple probes is abnormal.

For a device for thermally treating a wafer as a raw material of a semiconductor memory device, because the light source of the multiple heating lamps 103 is directly irradiated the inside of the device, the temperature difference value between the multiple probes 104 is not too large, generally, 2-5 degrees Celsius. If the temperature difference between two probes 104 is too large, it is indicated that at least one probe 104 of the two probes 104 is abnormal.

In the exemplary embodiment, the temperature difference value between the current temperature data of two probes 104 is compared with the preset temperature difference, and if the temperature difference value exceeds the preset temperature difference, it is determined that at least one of the two probes 104 is abnormal. In combination with the comparison result of the temperature difference value between other every two probes 104 with the preset temperature difference, the number of the probes 104 that may be abnormal in the multiple probes 104 is further determined.

If the temperature difference value exceeds the preset temperature difference, it is determined that at least one of the multiple probes 104 is abnormal. In this case, a power supply of a reaction chamber in the heat treatment device needs to be turned off, and the alarm information is sent to prompt the staff to further diagnose and repair the device.

In practical application, the preset temperature difference value may be set according to actual conditions, e.g., 20 degrees Celsius, 30 degrees Celsius, etc. In the exemplary embodiments, for the device for thermally treating the wafer as the raw material of the semiconductor memory device, the preset temperature difference value may be any value between 20 and 50 degrees Celsius.

In the exemplary embodiments, the temperature difference value is compared with the preset temperature difference, and if the temperature difference value exceeds the preset temperature difference, it can be determined that at least one of the multiple probes is abnormal. That is, it can be preliminarily determined that there is an abnormal probe, so as to facilitate the staff to take measures timely. Moreover, the method for identifying the probe abnormality provided in the exemplary embodiments may be implemented when the device is in an idle state before the device is processed, so that the probability that the probes are abnormal in the processing process of the device can be reduced, and the process yield of the device is improved.

In step S230, the device is heated to a preset temperature, and an abnormal probe is determined from the multiple probes.

After it is determined that at least one probe is abnormal by step S210 and step S220, it is necessary to determine the specifically abnormal probe, which includes a probe that may be damaged, so as to facilitate the staff to repair or replace the abnormal probe according to actual situations.

In practical application, the determination of step S230 may be performed only on the probe that may be abnormal, which is determined in step S220, or the determination of step S230 may also be performed on all probes in the device, so as to ensure that all probes that may be abnormal may be detected.

The exemplary embodiments are described by detecting all the multiple probes in the device. First, the device is heated to a first sub-preset temperature, and the first temperature data of the multiple probes is obtained. The heating the device to a first sub-preset temperature may be implemented by sending an instruction of heating the device to a first sub-preset temperature to the controller 101 in the heat treatment device 100, after receiving the instruction, the controller 101 controls the heating lamp driver 102 to work at required power to ensure that the multiple heating lamps 103 heat the interior of the device to the first sub-preset temperature.

In the heat treatment device 100, the probes measure temperature by radiation light, and therefore, the probes may be subjected to abnormality judgment in combination with blackbody radiation density. That is, after the device is heated to the first sub-preset temperature, according to the first temperature data read by the multiple probes, the formula in combination with the blackbody radiation density is:

$$\rho(\lambda) = \frac{2\pi hc^2}{\lambda^5 \left( e^{\frac{hc}{\lambda kT}} - 1 \right)} \quad (1)$$

Herein, h is the Planck constant, c is the speed of light, k is the Boltzmann constant, $\lambda$, is wavelength, and T is the temperature.

According to the Wien's displacement law, the corresponding wavelength $\lambda_{T1}$ may be obtained by the first temperature data $T_1$. The read first temperature data $T_1$ is taken as a T value, and $\lambda_{T1}$ is taken as the value of $\lambda$ to be substituted into formula (1), then a first radiation density of the probes $\rho(\lambda_1)$ corresponding to the first temperature data $T_1$ can be obtained. That is, the first radiation density $\rho(\lambda_1)$ corresponding to the temperature read by the probes may be calculated according to the first temperature data and the blackbody radiation density formula.

Figure 3:
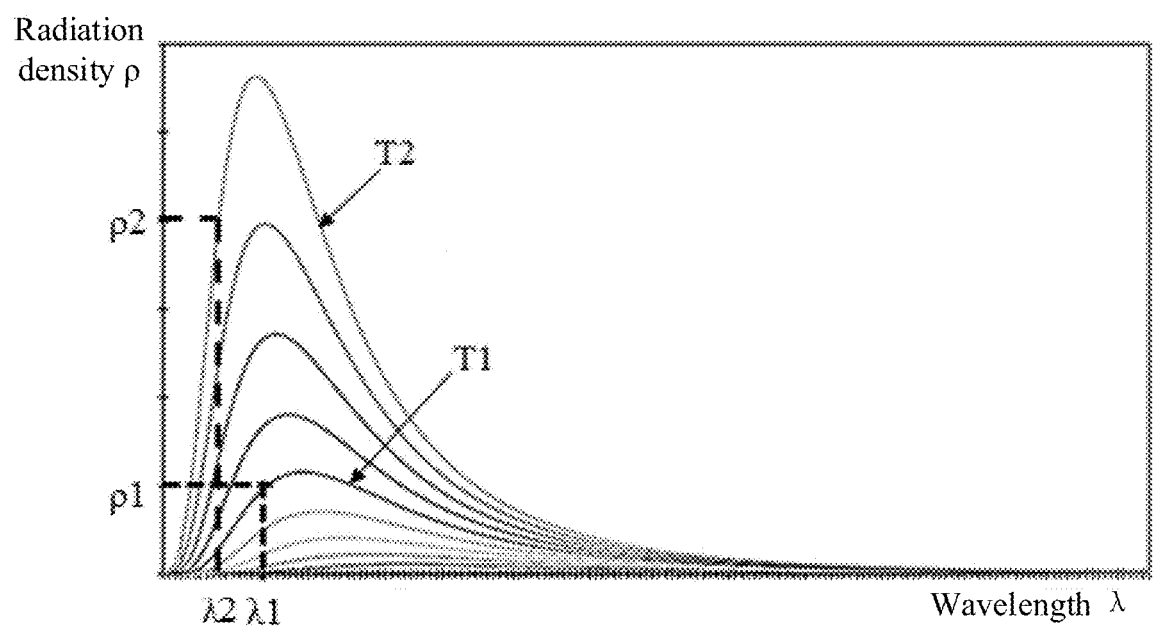
FIG. 3 is a schematic diagram illustrating blackbody radiation curves.

A first preset blackbody radiation density $\rho_1$ corresponding to the first sub-preset temperature may be determined according to blackbody radiation curves illustrated in FIG. 3. For example, when the first sub-preset temperature is 800 degrees Celsius, and the corresponding wavelength $\lambda_1$ thereof is 2.2 μm, the first preset blackbody radiation density may be determined to be $\rho_1$=200 J/(m$^3$·Hz) from the blackbody radiation curves.

A first density difference value $\Delta\rho_1$ between the first radiation density $\rho(\lambda_1)$ and the first preset blackbody radiation density $\rho_1$ is calculated. If the first density difference value $\Delta\rho_1$ exceeds a first preset density difference range, it is determined that the corresponding probe is abnormal and may be damaged.

In practical application, the first sub-preset temperature and the first preset density difference range may be determined according to actual requirements. For example, when the first sub-preset temperature is 800 degrees Celsius, the first preset density difference range may be from −50 to 50 J/(m$^3$·Hz). If the first density difference value $\Delta\rho_1$ is outside the range of −50 to 50 J/(m$^3$·Hz), it is determined that there is a damaged probe. In this case, information indicating which probe is damaged may be sent so as to facilitate the staff to repair or replace the probe.

If the first density difference value $\Delta\rho_1$ does not exceed the first preset density difference range, that is, the first density difference value $\Delta\rho_1$ is between −50 and 50 J/(m$^3$·Hz), the probes may be detected again. The device is heated to a second sub-preset temperature, the second temperature data $T_2$ of the multiple probes is obtained, and the corresponding wavelength $\lambda_{T2}$ is obtained according to the second temperature data $T_2$. The read second temperature data $T_2$ is taken as a T value, and $\lambda_{T2}$ is taken as the value of $\lambda$ to be substituted into formula (1), thereby obtaining a second radiation density $\rho(\lambda_2)$ of the probes corresponding to the second temperature data $T_2$. That is, the second radiation density $\rho(\lambda_2)$ corresponding to the temperature read by the probes may be calculated according to the second temperature data and the blackbody radiation density formula.

A second preset blackbody radiation density $\rho_2$ corresponding to the second sub-preset temperature may be determined according to the blackbody radiation curves illustrated in FIG. 3. For example, when the second sub-preset temperature is 1200 degrees Celsius, and the corresponding wavelength $\lambda_2$ thereof is 1.4 μm, the second preset blackbody radiation density may be determined to be $\rho_2 = 800$ J/(m$^3$·Hz) from the blackbody radiation curves.

A second density difference value $\Delta\rho_2$ between the second radiation density $\rho(\lambda_2)$ and the second preset blackbody radiation density $\rho_2$ is calculated. If the second density difference value $\Delta\rho_2$ exceeds a second preset density difference range, it is determined that the corresponding probe is abnormal.

In practical application, the second sub-preset temperature and the second preset density difference range may be determined according to actual requirements. For example, when the second sub-preset temperature is 1200 degrees Celsius, the second preset density difference range may be from −50 to 50 J/(m$^3$·Hz). If the second density difference value $\Delta\rho_2$ is outside the range from −50 to 50 J/(m$^3$·Hz), it is determined that the probe is damaged. In this case, the information indicating which probe is damaged may be sent so as to facilitate the staff to repair or replace the probe.

If the second density difference value $\Delta\rho_2$ does not exceed the second preset density difference range, that is, the second density difference value $\Delta\rho_2$ is from −50 to 50 J/(m$^3$·Hz), it is determined that the corresponding probe is normal.

In the exemplary embodiments, the device is generally heated to different temperatures, and the probes are detected and judged twice, so that all probes which may be abnormal may be detected, and the judgment accuracy is improved.

In practical application, the foregoing detection and judgment may be performed on the probes twice, twice or more, or only once. The number of times is not specifically limited in the exemplary embodiments.

Figure 4:
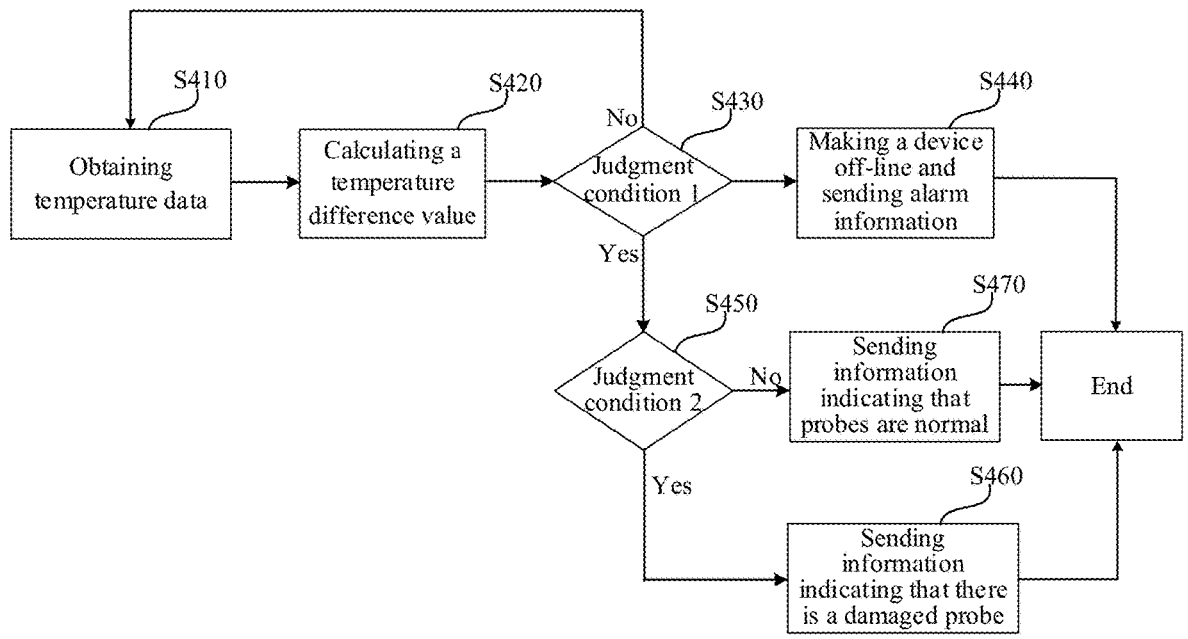
FIG. 4 is a schematic flowchart illustrating a probe abnormality identification process provided according to an exemplary embodiment of the disclosure.

FIG. 4 is a schematic flowchart illustrating a probe abnormality identification process provided according to the exemplary embodiment. As illustrated in FIG. 4, in step S410, current temperature data of the multiple probes is obtained. After the temperature data is obtained, step S420 is performed, and the temperature difference value between every two probes is calculated. Then in step S430, a judgment condition 1 is performed, and whether the temperature difference value exceeds a preset temperature difference or not is judged. If not, i.e., the judgment condition 1 is not met, step S410 is performed, and the current temperature data of the probes continue to be obtained. If yes, i.e., the judgment condition 1 is met, it is determined that there is an abnormal probe, step S440 is performed, and the device is made to be off-line and the alarm information is sent. Meanwhile, step S450 is performed, a judgment condition 2 is performed, and whether there is a damaged probe is judged. If the judgment condition 2 is met, step S460 is performed, and the information indicating which probe is damaged is sent so as to inform the staff to check or replace the probe timely. If the judgment condition 2 is not met, step S470 is performed, and information indicating that the probes are normal is sent, so as to prompt the staff to check other possible situations. Then the identification process is ended.

Figure 5:
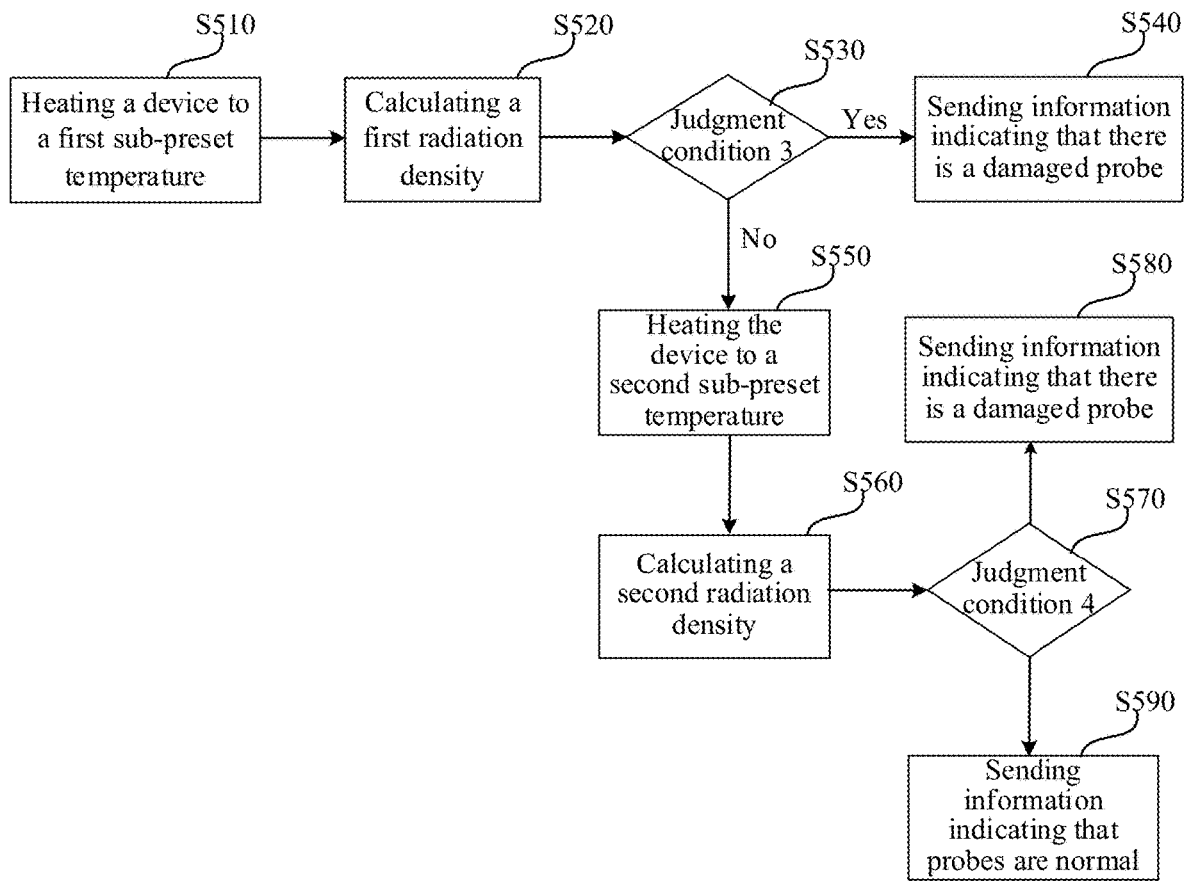
FIG. 5 is a schematic flowchart illustrating a probe damage judgment process according to an exemplary embodiment of the disclosure.

In the process of performing step S450, FIG. 5 is a schematic flowchart illustrating a probe damage judgment process provided according to the exemplary embodiment. As illustrated in FIG. 5, in step S510, the device is heated to a first sub-preset temperature. In step S520, the first radiation density $\rho(\lambda_1)$ corresponding to the temperature read by the probes is calculated. In step S530, a judgment condition 3 is performed, and whether $\rho(\lambda_1)$ exceeds the first preset density difference range is determined. If yes, step S540 is performed, and the information indicating that there is a damaged probe is sent. If not, step S550 is performed, and the device is heated to a second sub-preset temperature. Then in step S560, the second radiation density $\rho(\lambda_2)$ corresponding to the temperature read by the probes is calculated. In step S570, a judgment condition 4 is performed, and whether $\rho(\lambda_2)$ exceeds the second preset density difference range is determined. If yes, step S580 is performed, and the information indicating that there is a damaged probe is sent. If not, step S590 is performed, and the information indicating that the probe is normal is sent.

Figure 6:
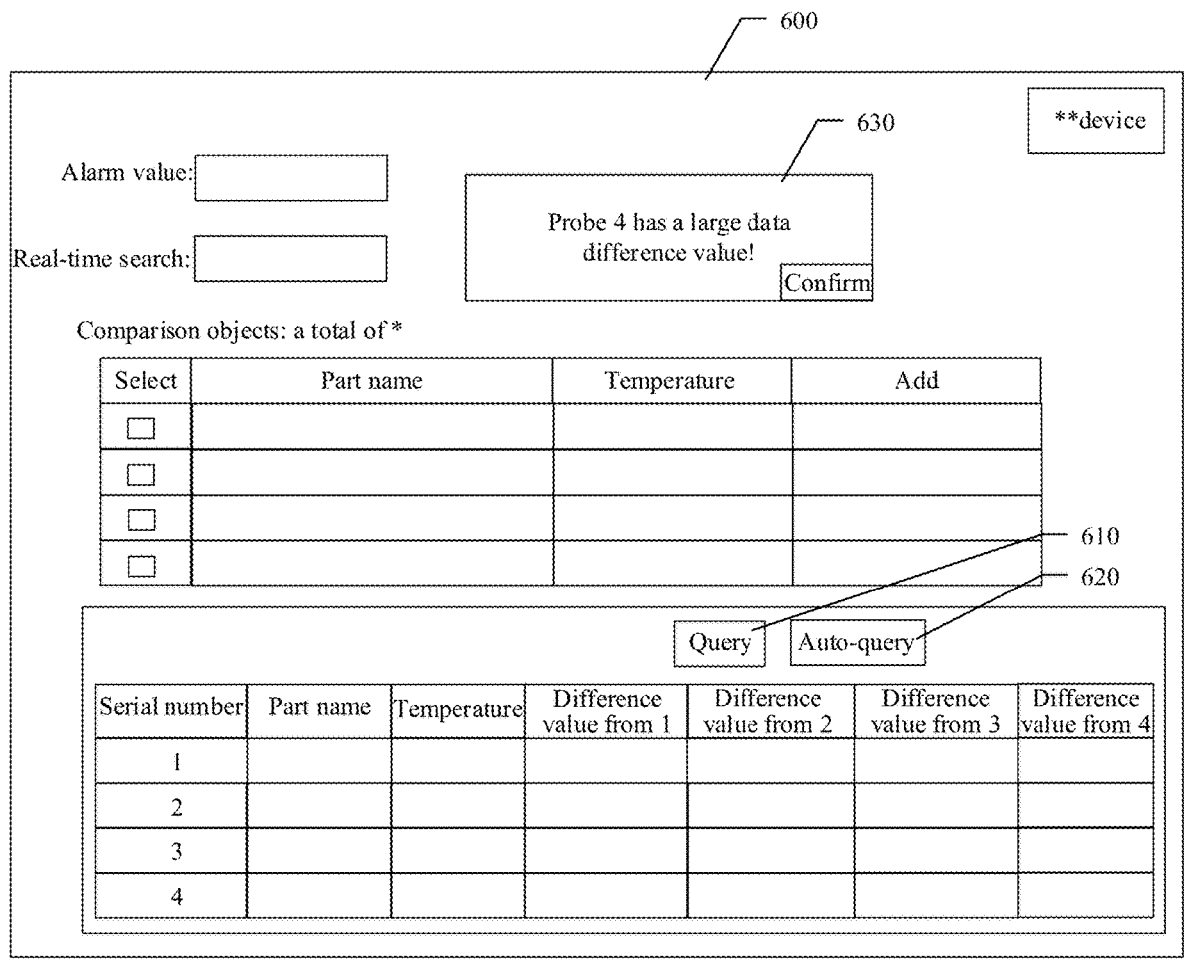
FIG. 6 is a schematic diagram illustrating an interface of a probe abnormality identification system according to an exemplary embodiment of the disclosure.

FIG. 6 is a schematic diagram illustrating the interface a probe abnormality identification system according to the exemplary embodiment. As illustrated in FIG. 6, a determined preset temperature difference (e.g., 12 degrees Celsius) may be set in an interface 600 as an alarm value. By clicking on a query button 610 on the interface, the current temperature data of the probes may be manually queried for a single time and displayed on the interface. By clicking on an auto-query button 620 on the interface, the obtained temperature and comparison result may be automatically displayed at a predetermined time interval. After the system performs data analysis and judgment, if a temperature difference value exceeds the preset temperature difference, prompt information may be displayed in an interface prompt box 630 so as to indicate that a certain probe has an abnormality. For example, probe 4 having a large data difference value is displayed, etc. The specific content of the prompt information is not specifically limited in the exemplary embodiments.

After information indicating that there may be an abnormal probe is sent, it is necessary to prompt the staff to check, and control the device to be heated to different temperatures, etc. The specific operation process may be manually controlled by the staff, or may be executed automatically by a program, which are not specifically limited in the exemplary embodiments.

In conclusion, according to the method for identifying the probe abnormality provided in the exemplary embodiment, it is determined whether a probe may be abnormal by comparing the temperature difference value between the probes, the probes are heated to a preset temperature, and then determining the corresponding blackbody radiation density is performed. Compared with determining whether there is damaged probe only by temperature, the influence of the temperature and the wavelength on probe performance is comprehensively considered in the method of determining whether there is a damaged probe by the blackbody radiation density, so that whether the probe is damaged may be determined from the principle. Therefore, the determination accuracy is higher, and the result is more reliable.

It should be understood that although the various steps of the method of the disclosure are described in a particular order in the drawings, it is not required or implied that the steps must be performed in the particular order, or all the steps shown must be performed to achieve the desired result.

Additionally or alternatively, certain steps may be omitted, multiple steps may be combined into one step, and/or one step may be decomposed into multiple steps and so on.

Figure 7:
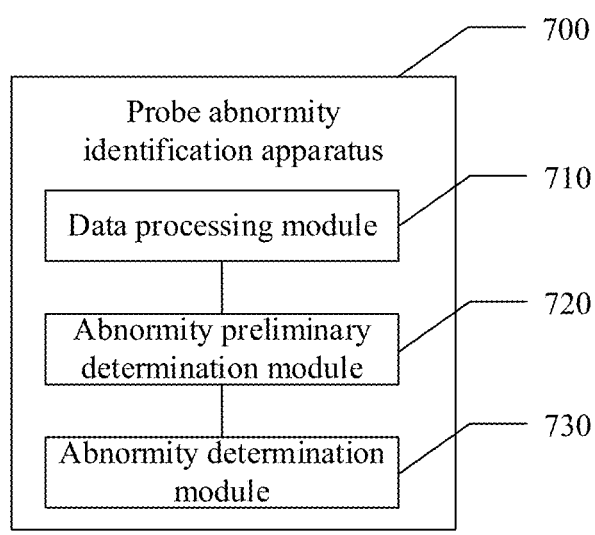
FIG. 7 is a block diagram illustrating an apparatus for identifying a probe abnormality according to an exemplary embodiment of the disclosure.

Furthermore, an apparatus for identifying a probe abnormality is further provided in the exemplary embodiments. The apparatus is applied to a device including multiple probes. Referring to FIG. 7, the apparatus 700 for identifying the probe abnormality may include: a data processing module 710, an abnormality preliminary determination module 720, and an abnormality determination module 730.

The data processing module 710 is configured to obtain current temperature data of the multiple probes, and calculate a temperature difference value between every two pieces of current temperature data.

The abnormality preliminary determination module 720 is configured to compare the temperature difference value with a preset temperature difference, and when the temperature difference value exceeds the preset temperature difference, determine that at least one of the multiple probes is abnormal.

The abnormality determination module 730 is configured to heat the device to a preset temperature, and determine an abnormal probe from the multiple probes.

Specific details of virtual modules of the apparatus for identifying the probe abnormality have been described in detail in the corresponding method for identifying the probe abnormality, and therefore will not be elaborated herein.

It should be understood that although several modules or units of the apparatus for identifying the probe abnormality are mentioned in the foregoing detailed description, such a division is not mandatory. In fact, the features and the functions of two or more modules or units described above may be embodied in one module or unit according to the embodiments of the disclosure. Likewise, features and functions of one module or unit described above may be further embodied in multiple modules or units.

In addition, the foregoing accompanying drawings are only schematic illustrations of the processing included in the method according to the exemplary embodiments of the disclosure, and are not intended for limitation. It is readily understood that the processing illustrated in the foregoing accompanying drawings does not indicate or limit a chronological order of such processing. In addition, it is also readily understood that such processing may be, for example, synchronously performed or asynchronously performed in a plurality of modules.

The exemplary embodiments of the disclosure further provide an electronic device capable of implementing the foregoing method.

Those skilled in the art can understand that various aspects of the disclosure may be implemented as systems, methods, or program products. Therefore, each aspect of the disclosure may be specifically implemented in the following forms, i.e., the implementation form of complete hardware, complete software (including firmware and microcode), or a combination of hardware and software, which may be uniformly referred to as "circuit", "module", or "system" herein.

An electronic device 800 according to this embodiment of the disclosure is described below with reference to FIG. 8. The electronic device 800 illustrated in FIG. 8 is only an example, and does not impose any restriction on functions and scopes of use of the embodiments of the disclosure.

Figure 8:
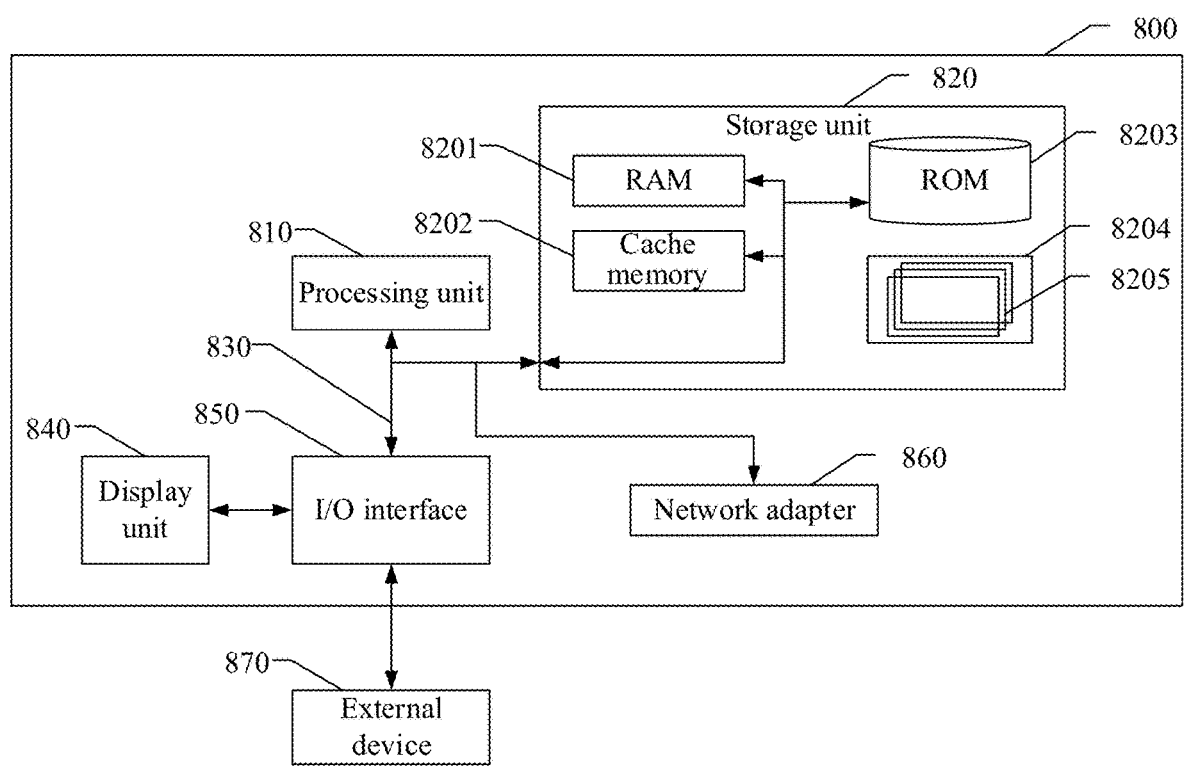
FIG. 8 is a block diagram illustrating the modules of an electronic device according to an exemplary embodiment of the disclosure.

As illustrated in FIG. 8, the electronic device 800 is represented in a form of a general-purpose computing device. Components of the electronic device 800 may include, but are not limited to: at least one processing unit 810, at least one storage unit 820, a bus 830 connecting different system components (including the storage unit 820 and the processing unit 810), and a display unit 840.

The storage unit 820 stores program code, and the program code may be executed by the processing unit 810, so that the processing unit 810 performs the steps according to various exemplary embodiments of the disclosure described in the foregoing "exemplary method" of this description. For example, the processing unit 810 may perform: step S210 as illustrated in FIG. 2, obtaining current temperature data of the plurality of probes, and calculating a temperature difference value between every two pieces of current temperature data; step S220, comparing the temperature difference value with a preset temperature difference, and when the temperature difference value exceeds the preset temperature difference, determining that at least one of the plurality of probes is abnormal; and step S230, heating the device to a preset temperature, and determining an abnormal probe from the plurality of probes.

The storage unit 820 may include a readable medium in the form of a volatile storage unit, for example, a Random Access Memory (RAM) 8201 and/or a cache storage unit 8202, and may further include a Read-Only Memory unit (ROM) 8203.

The storage unit 820 may further include a program/utility 8204 having a group of (at least one) program modules 8205. Such a program module 8205 includes, but is not limited to: an operating system, one or more application programs, other program modules, and program data. Each or a combination of these examples may include implementation of a network environment.

The bus 830 may indicate one or more of several types of bus structures, including a storage unit bus or storage unit controller, a peripheral bus, an accelerated graphics port, a processing unit, or a local bus using any of a plurality of bus structures.

The electronic device 800 may communicate with one or more external devices 870 (such as a keyboard, a pointing device, and a Bluetooth device), may communicate with one or more devices that enable a user to interact with the electronic device 800, and/or communicate with any device (such as router or a modem) that enables the electronic device 800 to communicate with one or more other computing devices. Such communication may be performed through an input/output (I/O) interface 850. Further, the electronic device 800 may further communicate with one or more networks (such as a Local Area Network (LAN), a Wide Area Network (WAN), and/or a public network such as the Internet) through a network adapter 860. As illustrated in the figure, the network adapter 860 communicates with other modules of the electronic device 800 through the bus 830. It should be understood that although not illustrated in the figure, other hardware and/or software modules may be used in combination with the electronic device 800, including, but not limited to microcode, a device driver, a redundancy processing unit, an external disk drive array, an RAID system, a tape drive, a data backup storage system, or the like.

Through descriptions of the foregoing embodiments, it is easy for those skilled in the art to understand that the exemplary embodiments described herein can be implemented by software or by combining software with necessary hardware. Therefore, the technical solutions according to the embodiments of this disclosure may be implemented in the form of a software product. The software product may be stored in a non-volatile storage medium (which may be a Compact Disk Read-Only Memory (CD-ROM), a USB flash drive, a removable hard disk, or the like) or in a network and includes several instructions for instructing a computer device (which may be a personal computer, a server, a terminal device, a network device, or the like) to perform the methods described in the embodiments of this disclosure.

The exemplary embodiments of this disclosure further provide a computer-readable storage medium having a computer program stored thereon for implementing the foregoing method of the description. In some possible embodiments, each aspect of this disclosure may be further implemented in a form of a program product, including program code. When the program product runs on a terminal device, the program code is used to enable the terminal device to perform the steps according to various exemplary embodiments of this disclosure described in the foregoing "exemplary method" of this description.

Figure 9:
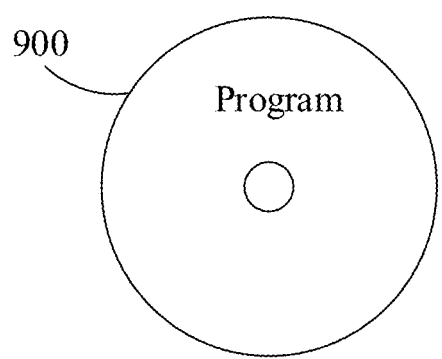
FIG. 9 is a schematic diagram illustrating a program product according to an exemplary embodiment of the disclosure.

FIG. 9 describes a program product 900 configured to implement the foregoing methods according to the embodiments of this disclosure, and the program product may use a portable CD-ROM and includes program code, and may run on a terminal device such as a personal computer. However, the program product of the disclosure is not limited to this. In this description, the readable storage medium may be any tangible medium including or storing a program, and the program may be used by or in combination with an instruction execution system, apparatus, or device.

The program product may be any combination of one or more readable media. The readable medium may be a readable signal medium or readable storage medium. The readable storage medium may be, for example, but is not limited to, an electric, magnetic, optical, electromagnetic, infrared, or semi-conductive system, apparatus, or device, or any combination thereof. More specific examples (non-exhaustive list) of the readable storage medium may include: an electrical connection having one or more wires, a portable disk, a hard disk, a RAM, a ROM, an Erasable Programmable Read-Only Memory (EPROM or flash memory), an optical fiber, a portable CD-ROM, an optical storage device, a magnetic storage device, or any appropriate combination thereof.

The computer-readable signal medium may include a data signal transmitted in a baseband or as part of a carrier, and the data signal carries readable program code. The propagated data signal may be in multiple forms, including, but not limited to, an electromagnetic signal, an optical signal, or any appropriate combination thereof. The readable signal medium may alternatively be any readable medium other than the readable storage medium. The readable medium may be configured to send, propagate, or transmit a program configured to be used by or in combination with an instruction execution system, apparatus, or device.

The program code included in the readable medium may be transmitted by using any suitable medium, including but not limited to, via wireless transmission, a wire, a cable, Radio Frequency (RF) or the like, or any suitable combination thereof.

The program code used for executing the operations of the disclosure may be written by using one or more programming languages or any combination thereof. The programming languages include an object-oriented programming language such as Java, C++ and the like, and also include a conventional procedural programming language such as "C" or similar programming languages. The program code may be completely executed on a user computing device, partially executed on user equipment, executed as an independent software package, partially executed on a user computing device and partially executed on a remote computing device, or completely executed on a remote computing device or server. For the case involving a remote computing device, the remote computing device may be connected to a user computing device through any type of network including a LAN or a WAN, or may be connected to an external computing device (for example, through the Internet by using an Internet service provider).

Furthermore, the foregoing accompanying drawings are only schematic illustrations of the processing included in the method according to the exemplary embodiments of the disclosure, and are not intended for limitation. It is easy to understand that the processing illustrated in the foregoing accompanying drawings does not indicate or limit a chronological order of such processing. In addition, it is also easy to understand that such processing may be, for example, synchronously performed or asynchronously performed in multiple modules.

Those skilled in the art can easily figure out other embodiments of this disclosure after considering the description and practicing the invention disclosed here. This disclosure is intended to cover any variations, functions, or adaptive changes of this disclosure. These variations, functions, or adaptive changes comply with general principles of this disclosure, and include common general knowledge or common technical means in the technical field that are not disclosed in this disclosure. The description and embodiments are merely considered to be exemplary, and the actual scope and spirit of this disclosure are pointed out in claims.

It should be understood that this disclosure is not limited to the precise structures described above and illustrated in the accompanying drawings, and various modifications and changes may be made without departing from the scope of this disclosure. The scope of this disclosure is defined by the appended claims.

What is claimed is:

1. A method for identifying a probe abnormality; applied to a device comprising a plurality of probes, and comprising:
    obtaining current temperature data of the plurality of probes, and calculating a temperature difference value between every two pieces of current temperature data;
    comparing the temperature difference value with a preset temperature difference, and when the temperature difference value exceeds the preset temperature difference, determining that at least one of the plurality of probes is an abnormal probe;
    heating the device to a first sub-preset temperature, and obtaining first temperature data of the plurality of probes;
    determining a first preset blackbody radiation density corresponding to the first sub-preset temperature;
    calculating a first radiation density of the plurality of probes according to the first temperature data and a blackbody radiation density formula; and
    calculating a first density difference value between the first radiation density and the first preset blackbody radiation density, and when the first density difference value exceeds a first preset density difference range, determining that a probe exceeding the first preset density difference is the abnormal probe.

2. The method for identifying the probe abnormality of claim 1, wherein the first preset density difference range is from −50 to 50 J/(m$^3$·Hz).

3. The method for identifying the probe abnormality of claim 1, wherein the first sub-preset temperature is 800 degrees Celsius, and the first preset blackbody radiation density is 200 J/(m$^3$·Hz).

4. The method for identifying the probe abnormality of claim 1, further comprising: when the temperature difference value exceeds the preset temperature difference, sending alarm information.

5. The method for identifying the probe abnormality of claim 1, wherein the preset temperature difference ranges from 20 to 50 degrees Celsius.

6. The method for identifying the probe abnormality of claim 1, wherein obtaining the current temperature data of the plurality of probes comprises:
obtaining temperature data of the plurality of probes at a same time at a preset time interval.

7. The method for identifying the probe abnormality method of claim 1, further comprising:
when the first density difference value does not exceed the first preset density difference range, heating the device to a second sub-preset temperature, and obtaining second temperature data of the plurality of probes;
determining a second preset blackbody radiation density corresponding to the second sub-preset temperature;
calculating a second radiation density of the probes according to the second temperature data and the blackbody radiation density formula;
calculating a second density difference value between the second radiation density and the second preset blackbody radiation density, and when the second density difference value exceeds a second preset density difference range, determining that a probe exceeding the second preset density difference is the abnormal probe; and
when the second density difference value does not exceed the second preset density difference range, determining that a probe not exceeding the second preset density difference is a normal probe.

8. The method for identifying the probe abnormality of claim 7, wherein the second preset density difference range is from −50 to 50 $J/(m^3 \cdot Hz)$.

9. The method for identifying the probe abnormality of claim 7, wherein the second sub-preset temperature is 1200 degrees Celsius, and the second preset blackbody radiation density is 800 $J/(m^3 \cdot Hz)$.

10. A non-transitory computer-readable storage medium having stored thereon a computer program which, when executed by a processor, causes the processor to perform a method for identifying a probe abnormality; the method comprising:
obtaining current temperature data of a plurality of probes, and calculating a temperature difference value between every two pieces of current temperature data;
comparing the temperature difference value with a preset temperature difference, and when the temperature difference value exceeds the preset temperature difference, determining that at least one of the plurality of probes is an abnormal probe;
heating the device to a first sub-preset temperature, and obtaining first temperature data of the plurality of probes;
determining a first preset blackbody radiation density corresponding to the first sub-preset temperature;
calculating a first radiation density of the plurality of probes according to the first temperature data and a blackbody radiation density formula; and
calculating a first density difference value between the first radiation density and the first preset blackbody radiation density, and when the first density difference value exceeds a first preset density difference range, determining that a probe exceeding the first preset density difference is the abnormal probe.

11. An electronic device, comprising:
a processor; and
a memory for storing one or more programs that, when executed by the processor, cause the processor to perform a method for identifying a probe abnormality; the method comprising:
obtaining current temperature data of a plurality of probes, and calculating a temperature difference value between every two pieces of current temperature data;
comparing the temperature difference value with a preset temperature difference, and when the temperature difference value exceeds the preset temperature difference, determining that at least one of the plurality of probes is an abnormal probe;
heating the device to a first sub-preset temperature, obtaining first temperature data of the plurality of probes;
determining a first preset blackbody radiation density corresponding to the first sub-preset temperature;
calculating a first radiation density of the plurality of probes according to the first temperature data and a blackbody radiation density formula; and
calculating a first density difference value between the first radiation density and the first preset blackbody radiation density, and when the first density difference value exceeds a first preset density difference range, determining that a probe exceeding the first preset density difference is the abnormal probe.

12. The electronic device of claim 11, wherein the first preset density difference range is from −50 to 50 $J/(m^3 \cdot Hz)$.

13. The electronic device of claim 11, wherein the first sub-preset temperature is 800 degrees Celsius, and the first preset blackbody radiation density is 200 $J/(m^3 \cdot Hz)$.

14. The electronic device of claim 11, wherein the method further comprises: when the temperature difference value exceeds the preset temperature difference, sending alarm information.

15. The electronic device of claim 11, wherein the preset temperature difference ranges from 20 to 50 degrees Celsius.

16. The electronic device of claim 11, wherein the method further comprises:
when the first density difference value does not exceed the first preset density difference range, heating the device to a second sub-preset temperature, and obtaining second temperature data of the plurality of probes;
determining a second preset blackbody radiation density corresponding to the second sub-preset temperature;
calculating a second radiation density of the probes according to the second temperature data and the blackbody radiation density formula;
calculating a second density difference value between the second radiation density and the second preset blackbody radiation density, and when the second density difference value exceeds a second preset density difference range, determining that a probe exceeding the second preset density difference is the abnormal probe; and
when the second density difference value does not exceed the second preset density difference range, determining that a probe not exceeding the second preset density difference is a normal probe.

17. The electronic device of claim 16, wherein the second preset density difference range is from −50 to 50 $J/(m^3 \cdot Hz)$.

18. The electronic device of claim 16, wherein the second sub-preset temperature is 1200 degrees Celsius, and the second preset blackbody radiation density is 800 J/(m$^3$·Hz).

* * * * *